United States Patent [19]
Hossner

[11] Patent Number: 5,337,208
[45] Date of Patent: Aug. 9, 1994

[54] IN-LINE AC CURRENT LIMITER

[75] Inventor: Steven E. Hossner, Hillsboro, Oreg.

[73] Assignee: NEC America, Inc., Melville, N.Y.

[21] Appl. No.: 808,875

[22] Filed: Dec. 18, 1991

[51] Int. Cl.⁵ ............................................. H02H 3/24
[52] U.S. Cl. ....................................... 361/93; 361/18; 361/77; 361/100
[58] Field of Search ............... 361/93, 77, 100, 18; 323/17, 20, 22

[56] References Cited

U.S. PATENT DOCUMENTS

| | | | |
|---|---|---|---|
| 3,521,087 | 5/1969 | Lombardi | 361/93 |
| 3,558,830 | 1/1971 | Bender | 179/81 |
| 3,571,608 | 3/1971 | Hurd | 361/77 |
| 3,987,357 | 10/1976 | Edstrom et al. | 323/17 |
| 4,456,940 | 6/1984 | Hammerberg et al. | 361/56 |
| 4,475,012 | 10/1984 | Coulmance | 361/91 |
| 4,876,620 | 10/1989 | Borkowicz | 361/56 |

Primary Examiner—A. D. Pellinen
Assistant Examiner—S. Jackson
Attorney, Agent, or Firm—Sughrue, Mion, Zinn, Macpeak & Seas

[57] ABSTRACT

An AC current limiter, which is connected in series with a transmission line and which operates in two modes, a conductive mode and a protective mode, includes first and second transistors coupled in parallel with first and second diodes, respectively and the emitters of the first and second transistors serially coupled by a sensing element. First and second gain control networks are couple to the first and second transistors, respectively, to permit control of the gain in the first and second transistors. More particularly, as line current increases to a limiting value, the circuit operates in the protective mode. The voltage across the sensing causes a transistor in one of the first and second networks to turn on, thus diverting current from the respective first and second transistors connected in series with the transmission line. Therefore, line current is limited to a predetermined value. When the current through the circuit reverses, the other transistor and respective gain control network limits current flowing in the opposite direction.

16 Claims, 2 Drawing Sheets

IN-LINE AC CURRENT LIMITER

FIELD OF THE INVENTION

The present invention relates generally to current limiting devices. More specifically, the present invention relates to inline AC current limiter devices. The present invention is particularly useful in connection with invertor circuits.

BACKGROUND OF THE INVENTION

Protective circuits for electronic equipment generally include over-current protective circuits, over-voltage protective circuits or a combination of over-current and over-voltage protective circuits. Current limiting circuits or devices can be generally grouped as falling in one of two categories.

The first category includes circuits for diverting current flow from a conductor. U.S. Pat. Nos. 3,558,830, 3,571,608, 4,456,940 and 4,876,620 are exemplary of protective circuits in this category.

The second category includes inline circuits which limit current flow between the circuits input and output terminals, which are serially connected between two conductors forming a single line. U.S. Pat. No. 3,521,087, for example, discloses a current limiting circuit which includes three field effect transistors (FETs) located between transmission lines. A first transistor is used to control or "pinch off" excess current while two other transistors, which are connected in series with the first transistor, are used to bias or control the first transistor.

U.S. Pat. No. 4,475,012 discloses both overvoltage and overcurrent protection circuits for a telephone set. The overcurrent limiting circuit illustrated in FIG. 3 of that patent includes a first NPN transistor whose collector is connected to the cathode of a diode, the anode of the diode being connected to the input terminal of the circuit, the emitter of the transistor being connected to the output terminal of the circuit via a resistor. A second PNP transistor and a third NPN transistor are arranged in series between the input and output terminals, with the respective emitters being connected to the terminals. The base of the second transistor is connected to the collector of the first transistor and the base of the third transistor is connected to the emitter of the first transistor. A fourth NPN transistor has its emitter connected directly to the output terminal while the collector is connected to the input terminal via two series-arranged resistors. The sensing elements associated with this circuit include a pair of serially connected resistors and a zener diode located in another branch of the circuit.

From the exemplary circuit shown in FIG. 3 of U.S. Pat. No. 4,475,012, problems with the prior art can be easily discerned. For example, that circuit is a unidirectional circuit, which is not suited for AC signal applications. In addition, the circuit is expensive to manufacture due to the large number of components. The high number of individual components also results in a relatively high loss or voltage drop in the circuit.

SUMMARY OF THE INVENTION

The principal object of the present invention is to overcome the deficiencies found in prior art current limiters.

Another object of the present invention is to provide an inline AC current limiter.

Yet another object of the present invention is to provide a current limiter which is independent of the applied line voltage. Thus, the current limiter advantageously can be used in transmission lines where the voltage can vary but the current cannot exceed a predetermined value.

Still another object of the present invention is to provide a current limiter which exhibits low losses when not operating in the current limiting mode.

Another object of the present invention is to provide a current limiter which can be manufactured at low cost.

Still another object of the present invention is to provide a current limiter which limits current in first and second directions when the current exceeds first and second thresholds, respectively. In other words, the current limiter advantageously can made to limit current in an asymmetric manner.

The current limiter according to the present invention is particularly useful as a protective device for devices which convert DC power to AC power, which circuits are generally referred to as invertor circuits.

These and other objects, features and advantages of the present invention are provided by an AC current limiter comprising an AC current limiter circuit, comprising a first series circuit defining a first path for flow of current in a first direction, the first circuit comprising, a first terminal, a first transistor collector coupled to the first terminal, a first diode serially coupled to the emitter of the first transistor by a sensing element, and a second terminal serially coupled to the first diode, a second circuit defining a second path for flow of current in a second direction, the second circuit comprising, the second terminal, a second transistor collector coupled to the second terminal, a second diode serially coupled to the emitter of the second transistor by the sensing element and to the first terminal, wherein the current flow in the first and the second paths is responsive to a change in a predetermined parameter of the sensing element. According to one aspect of the present invention, the first and second transistors are NPN Darlington transistors.

These and other objects, features and advantages of the present invention are provided by an AC current limiter circuit for limiting current flow in first and second directions when current exceeds a predetermined value. The current limiter circuit includes first and second terminals, first through fourth transistors, first and second diodes, a sensing element, first and second resistors, and first and second elements having first and second predetermined breakdown voltages, respectively. Current flows in the first direction via a first path defined by the first terminal, the first transistor, the sensing element, the second diode and the second terminal, all of which are serially connected in that order. Current advantageously flows in the second direction via a path defined by the second terminal, the second transistor, the sensing element, the first diode and the first terminal, all of which are serially connected in that order. A first gain control network for controlling the first transistor responsive to a change in a predetermined parameter associated with the sensing element comprises the first resistor serially connected between the first terminal and the third transistor, the first element coupled between the third transistor and the second diode, wherein the third transistor is coupled between the emitter and base of the first transistor. A second gain control network for controlling the second transistor responsive to a change in a predetermined parameter associated with the sensing element comprises the second resistor serially connected between the second terminal and the fourth transistor, the second element coupled between the fourth transistor and the first diode, wherein the fourth transistor is coupled between the emitter and base of the second transistor. Current flow in the first and second directions is limited by turning ON the third and fourth transistors, respectively, so as to permit the first and second transistors, respectively, to be turned to a reduced gain state when the predetermined value of current through the sensing element is exceeded.

According to one aspect of the present invention, the predetermined value of current at which the current limiter circuit operates is adjustable by varying the resistance of the sensing element or by changing the breakdown voltages of the first and second elements. It will be noted that the sensing element can comprise a variable resistor.

According to another aspect of the present invention, an AC transmission line, comprising first and second conductors spaced apart from one another, can be produced by serially connecting the first and second conductors using the AC current limiter circuit.

According to yet another aspect of the present invention, a less robust current limiter can be produced by serially connecting the first and second terminals with another resistor so as to permit limited current flow through that resistor, which is parallel with the equivalent resistance of the current limiter circuit.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted by like of similar numbers, and in which.

DESCRIPTION OF THE PREFERRED EMBODIMENTS

A first embodiment according to the present invention will be described with reference to FIG. 1, wherein an AC current limiter 1 comprises first and second transistors Q1 and Q2, which are serially coupled to one another by a sensing element R1. Preferably, transistors Q1 and Q2 are NPN transistors which advantageously are emitter-to-emitter coupled by sensing element R1. Most preferably, elements Q1 and Q2 are high gain NPN transistors such as Darlington transistors. Sensing element R1 advantageously can be a low valued resistor. Each of the collectors of transistors Q1 and Q2 are connected to a respective one of terminals T1 and T2 of the current limiter 1. A pair of diodes CR1 and CR2 are connected in parallel with respective ones of transistors Q1 and Q2. Preferably, the anode of each diode is connected to the emitter of its respective transistor while the cathode is connected to the collector. Preferably, diodes CR1 and CR2 are conventional diodes.

From the description given thus far, it will be noted that two current paths are defined by these elements. A first path is defined by terminal T1, transistor Q1, sensing element R1, diode CR2 and terminal T2, in that order. A second path, which advantageously permits current flow in a direction opposite to that of the first path, is defined by terminal T2, transistor Q2, sensing element R1, diode CR1 and terminal T1 in that order. It will noted that sensing element R1 is common to both paths.

Gain control networks for controlling the respective gains of transistors Q1 and Q2, and thus the current flowing in the first and second paths of current limiter 1, include a transistor, a resistor and a diode associated with each of the transistors Q1 and Q2, which are connected as described below.

A resistor R3 is connected between the collector and the base of transistor Q1, which base is advantageously connected to the collector of a transistor Q3. The base of transistor Q3 is connected to the emitter of transistor Q1 while the emitter of transistor Q3 is coupled to the anode of diode CR2 via serially connected diode CR3. A resistor R2, a transistor Q4 and a diode CR4 are connected in an identical manner to transistor Q2 and diode CR2. Preferably, diodes CR3 and CR4 are zener diodes.

Figure 1:
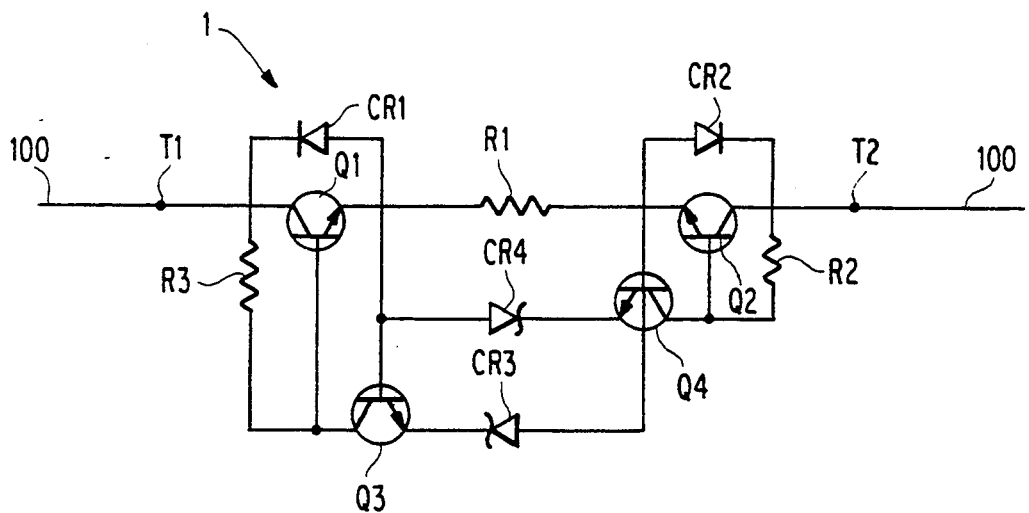
FIG. 1 is a schematic diagram of a current limiter according to a first embodiment of the present invention.

In FIG. 1, current limiter 1 is shown serially connecting first and second portions of a conductor 100. It will be appreciated that current limiter 1 can be utilized to form a current limited AC transmission line.

Figure 2:
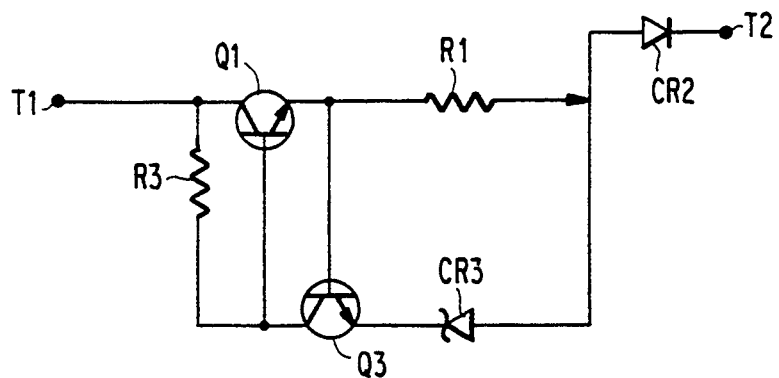
FIG. 2 is a schematic diagram showing a selected portion of the schematic diagram of FIG. 1, which is useful for explaining the operation of the present invention.
Figure 3:
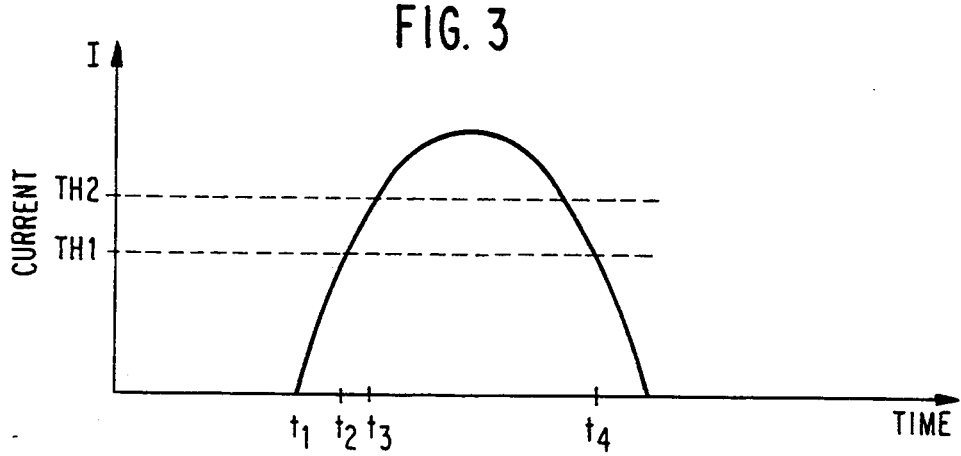
FIG. 3 is a graphical illustration of the positive half of a AC signal used in explaining the operation of the circuit shown in FIG. 2.

The operation of current limiter 1 will now be described while referring to FIGS. 2 and 3. FIG. 2 shows one half of the current limiter 1, which conducts current in the first direction, e.g., current flowing during the positive half cycle of an AC signal. FIG. 3 shows current with respect to time applied to the circuitry shown in FIG. 2.

At time $t_1$, a positive current is applied at terminal T1, thereby applying power to the base of transistor Q1 via resistor R3, producing current flow through the base-emitter junction to turn transistor Q1 on. Current then flows through transistor Q1, sensing element R1 and diode CR2. It will be appreciated that at time $t_1$, transistor Q3 is in the OFF state. As current increases from time $t_1$ to time $t_2$, the voltage drop across sensing element R1 increases. At time $t_2$, the applied current, which is now at the threshold value TH1, induces a voltage in sensing element R1 which exceeds the sum of the voltage $V_{BE}$ of transistor Q3 plus the zener voltage of diode CR3, which advantageously turns transistor Q3 ON. Transistor Q3 diverts current from the base of transistor Q1, which advantageously drives transistor Q1 from the ON state towards the OFF state, thus setting transistor Q1 to a reduced gain state.

It will be appreciated that transistor Q1 operates in the saturation state as soon as current is applied to terminal T1, or shortly thereafter. It will also be appreciated that, as transistor Q1 goes from the saturation state to the OFF state, transistor Q1 limits or pinches off current flowing in the first direction. When the applied current decreases to threshold TH1 at time t₄, the voltage drop across sensing element R1 decreases below the sum of $V_{BE}$ plus the zener voltage, permitting transistor Q3 to turn OFF. Thus, transistor Q1 returns to operation in the saturation state until the applied current reaches zero.

It will be noted that the operation during the negative half cycle is identical to that for the positive half cycle. However, during the negative half cycle, the transistors Q2 and Q4 cooperate to limit current flow in the second path.

Those of ordinary skill in the art will appreciate from the discussion above that there are two ways to change the threshold at which the current limiter 1 operates to limit current flow. The first way is to change the value of sensing element R1. For example, decreasing the resistance value of sensing element R1 advantageously allows the circuitry shown in FIG. 2 to conduct until a second threshold TH2 is reached at time t₃. The second way is to change the values of zener voltages for diodes CR3 and CR4.

Preferably, diodes CR3 and CR4 have identical zener voltages to allow current limiter 1 to operate at the same threshold during both the positive and negative half cycles of the applied AC signal. The zener voltages of diode CR3 and CR4 advantageously can be different from one another to permit the current limiter 1 to operate, for example, using first threshold TH1 on the positive half cycle and second threshold TH2 on the negative half cycle.

Figure 4:
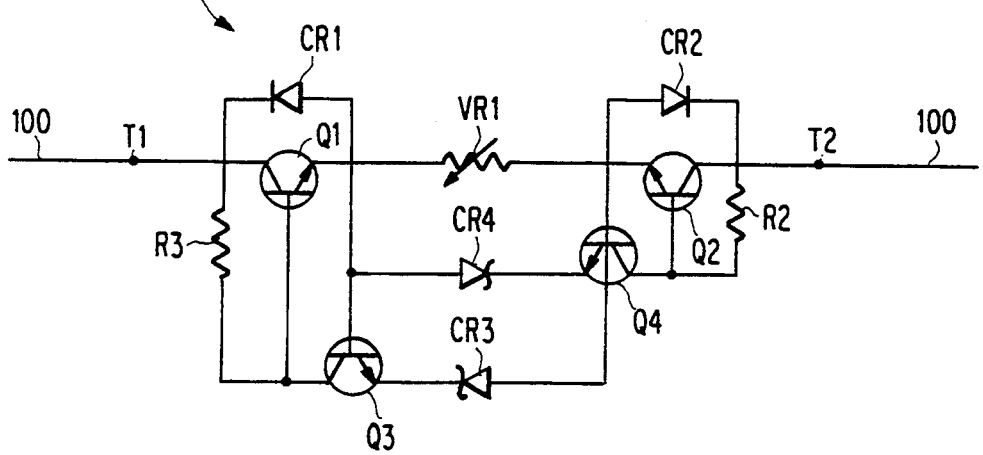
FIG. 4 is a schematic diagram of a current limiter according to a second embodiment of the present invention.

It will also be appreciated that the threshold value for current limiter 1 advantageously can be variable when sensing element R1 is replaced with, for example a variable resistor VR1. A second embodiment according to the present invention, wherein a current limiter 1' includes variable resistor VR1 as the sensing element, is shown in FIG. 4. All of the other elements in current limiter 1' are identical to those of current limiter 1 and both current limiters 1, 1' operate in the same manner. Therefore, additional discussion of the construction and operation of current limiter 1' will not be provided.

Figure 5:
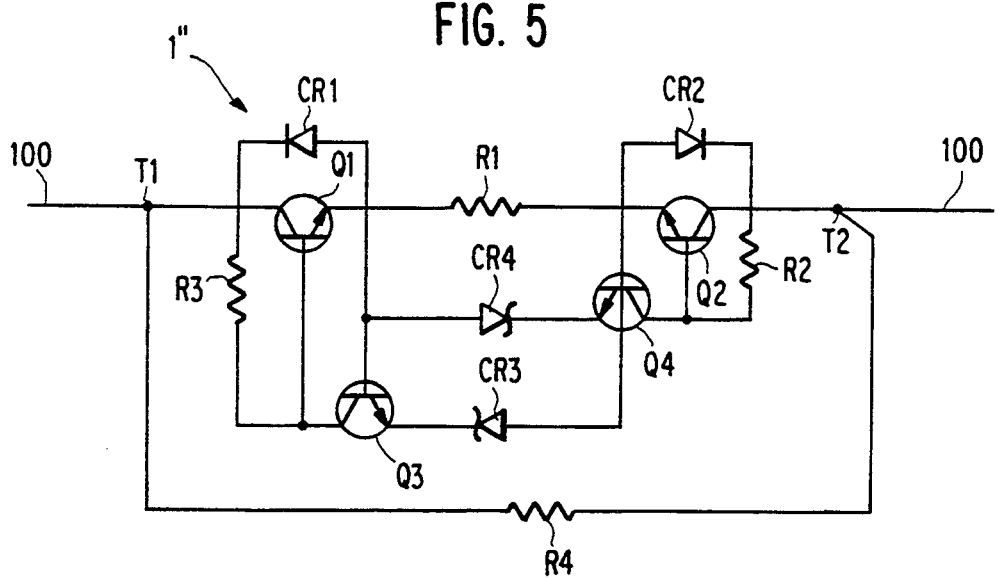
FIG. 5 is a schematic diagram of a current limiter according to a third embodiment of the present invention.

A third embodiment according to the present invention will be discussed while referring to FIG. 5, wherein a current limiter 1" comprises a resistor R4 serially connected in parallel with the current limiter 1 illustrated in FIG. 1. All other components used in the circuits illustrated in FIGS. 1 and 5 are similar in construction and operation, and, therefore, additional discussion of these circuits will not be provided.

It will be appreciated that current limiter 1 is electrically equivalent to a resistor having a value substantially equal to the resistance of sensor element R1 when the current through sensor element R1 is less that the value of TH1. Thus, in the current limiter 1", the majority of current flows in the branch of the circuit including sensor element R1. However, when the current through sensing element R1 increases to a value above TH1, the effective resistance of current limiter 1 is substantially increased. In current limiter 1", operation of either Q1 or Q2 in the reduced gain state results in an increased current flow through resistor R4. In other words, the current limiter 1 provides a robust or hard current limiter circuit while current limiter 1" provides a less robust on soft current limiter circuit.

It will be noted from the discussion above that the most preferred form of transistors Q1 and Q2 are Darlington NPN transistors. This, or similar types of NPN transistors, advantageously permits transistors Q1 and Q2 to operate with very high gains. High gain transistors such as Darlington transistors advantageously allow current limiter 1 to operate at a high efficiency factor, typically at or above 95%. In addition, these high gain transistors provide a sharp transition between saturated state operation and current limited operation.

It will also be appreciated that transistor types with lower gains advantageously can be used in place of the preferred Darlington NPN transistors when a less sharp mode transition characteristic is desirable. Transistor having gains different from one another advantageously can be used as transistors Q1 and Q2 when the required current limiting characteristics for the positive and negative half cycles are different from one another.

It will be appreciated that the AC current limiter according to the present invention utilizes a small number of components. Thus the AC current limiter advantageously can be produced at low cost.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An AC current limiter circuit, comprising:
   a sensing element;
   a first series circuit defining a first path for flow of current in a first direction through said sensing element, said first circuit comprising:
   a first terminal;
   a first switch element having a collected coupled to said first terminal;
   a first diode serially coupled to an emitter of said first switch element by said sensing element;
   a second terminal serially coupled to said first diode;
   a second circuit defining a second path for flow of current in a second direction through said sensing element, said second circuit comprising;
   said second terminal;
   a second switch element having a collector coupled to said second terminal;
   a second diode serially coupled to an emitter of said second switch element by said sensing element and to said first terminal; and
   first and second gain control networks allowing control of gain associated with said first and second switch elements;
   wherein said current flow in said first and said second paths is responsive to a change in a predetermined parameter of said sensing element.

2. The invention of claim 1, wherein said sensing element is a resistor.

3. The invention of claim 1, wherein said sensing element is a variable resistor.

4. The invention of claim 1, wherein said first and second switch elements are NPN transistors.

5. The invention of claim 1, wherein said first and second switch elements are NPN Darlington transistors.

6. An AC current limiter circuit for limiting current flow in first and second directions when current exceeds a predetermined value, comprising:
   first and second terminals;

first through fourth switch elements;
first and second diodes;
a sensing element;
first and second resistors; and
first and second elements having first and second predetermined breakdown voltages, respectively;
wherein current flows in said first direction via a first path defined by said first terminal, said first switch element, said sensing element, said second diode and said second terminal, all of which are serially connected in that order;
wherein current flows in said second direction via a second path defined by said second terminal, said second switch element, said sensing element, said first diode and said first terminal, all of which are serially connected in that order,
wherein a first gain control network for controlling said first switch element responsive to a change in a predetermined parameter associated with said sensing element comprises said first resistor serially connected between said first terminal and said third switch element, said first element coupled between said third switch element and said second diode, and wherein said third switch element is coupled between an emitter and a base of said first switch element;
wherein a second gain control network for controlling said second switch element responsive to a change in a predetermined parameter associated with said sensing element comprises said second resistor serially connected between said second terminal and said fourth switch element, said second element coupled between said fourth switch element and said first diode, and wherein said fourth switch element is coupled between an emitter and a base of said second switch element; and
wherein current flow in said first and second directions is limited by turning ON said third and fourth switch elements, respectively, so as to permit said first and second switch elements, respectively, to be turned to a reduced gain state when said predetermined value of current through said sensing element is exceeded.

7. The invention of claim 6, wherein said sensing element is a resistor.

8. The invention of claim 6, wherein said sensing element is a variable resistor.

9. The invention of claim 6, wherein said first through fourth switch elements are NPN transistors.

10. The invention of claim 6, wherein said first and second switch elements are NPN Darlington transistors.

11. The invention of claim 6, wherein said first and second switch elements are NPN Darlington transistors and wherein said third and fourth switch elements are NPN transistors.

12. The invention of claim 6, wherein said predetermined value comprises first and second predetermined values different from one another.

13. The invention of claim 6, wherein said first and second breakdown voltages are equal to one another.

14. The invention of claim 6, wherein respective gains of said first and second switch elements are equal to one another.

15. The invention of claim 6, further comprising a third resistor serially coupled between said first and second terminals.

16. An AC transmission line comprising first and second conductors spaced apart from one another, wherein said first and second conductors are serially coupled by an AC current limiter circuit as recited in claim 6.

* * * * *